March 25, 1941.    L. G. COPEMAN    2,235,959
SUET CAKE CONTAINER
Filed April 15, 1938
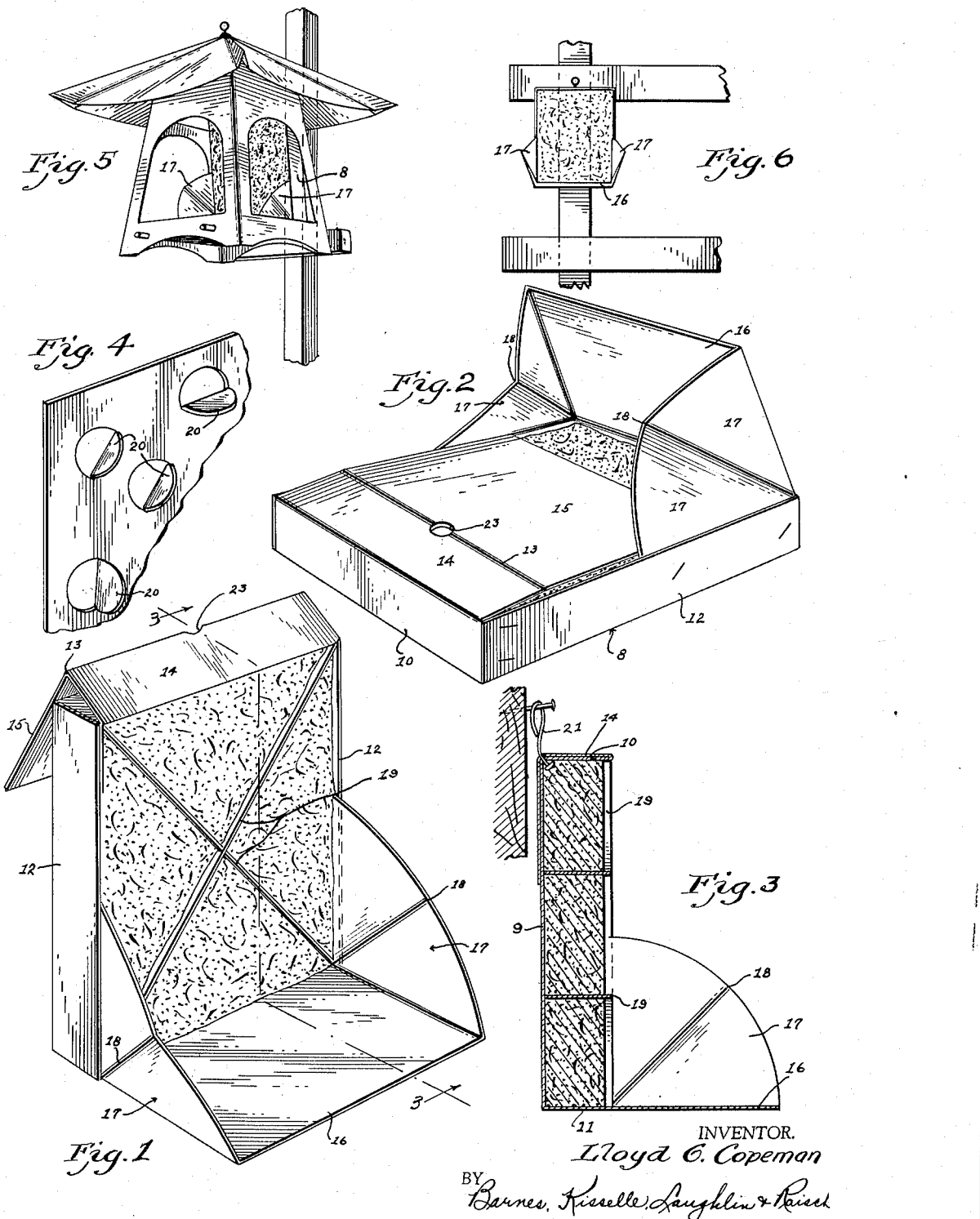
INVENTOR.
Lloyd G. Copeman
BY Barnes, Kisselle, Laughlin & Raisch
ATTORNEYS Patented Mar. 25, 1941

2,235,959

UNITED STATES PATENT OFFICE 2,235,959

SUET CAKE CONTAINER

Lloyd G. Copeman, Flint, Mich.

Application April 15, 1938, Serial No. 202,159

5 Claims. (Cl. 119—51)

This invention relates to a suet cake for birds.

It is well known to provide suet for birds especially in the wintertime. The customary way to make this suet available is to put natural suet out in wire baskets or other perforated containers which prevent loose pieces from falling to the ground. The present invention contemplates the placing of suet in containers, it being first melted and poured into the containers which serve as molds.

It is the object of the present invention to provide a container for a suet cake which is especially adapted for use with a combination of suet and grain.

A further object is to provide a container which facilitates shipping of the cake and prevents breakage during the handling thereof.

Additional features and objects of the invention have to do with details of the suet cake enclosure which make it especially useful when the suet cake is placed at the disposal of the birds.

Other objects have to do with details of construction and fabrication as will be more clearly brought forth in the following description and claims.

In the drawing:

Fig. 1 is a perspective view of the suet cake and the container.

Fig. 2 illustrates the manner in which the container folds.

Fig. 3 is a section taken on the lines 3—3 of Fig. 1.

Fig. 4 is a modified form of backing for the suet cake.

Fig. 5 is an illustration of the manner in which the cake may be used with a bird shelter.

Fig. 6 is a view of the cake as suspended in the open.

The container for a suet cake shown in the drawing is preferably a rectangular shallow box 8 having one open side. The box is preferably formed of a waterproof paper and comprises a back or bottom 9, ends 10 and 11, and sides 12. The end 10 is extended to form a cover flap folded at 13 to form two portions 14 and 15, the portion 14 having dimensions substantially identical with end 10. The end 11 is extended to form a collapsing tray member and cover portion which comprises a bottom 16, and sides 17, the latter being segmental in shape, folded at 18, and fastened to sides 12 at their free edges.

The manner in which the container is covered when this is so desired is shown in Fig. 2. The portions 14 and 15 are folded over the open side from end 10. The sides 17 of the tray member 16 are folded inward at 18 so that they collapse over the cover portion 15. The bottom 16 of the tray completes the cover for the container. If it is desired this enclosed container may be provided with a telescoping rectangular cover or it may be otherwise suitably wrapped.

A suet cake is formed by filling the box with melted suet and allowing the same to chill into a solid cake. Since the container must thus serve as a mold, it is preferably made so that the joints are substantially liquid tight. A preferred form of suet cake is provided by first filling the box with what is commonly referred to as "scratch feed" for bird life of all kinds. The melted suet is then poured in so that it fills the interstices of the grain and forms a solid cake. In order to prevent the cake from breaking, I have found that it is desirable to provide reinforcing pieces 19 which extend diagonally across said container. These pieces 19 are preferably fastened at the upper end as viewed in Fig. 1, to facilitate the fashioning of the cake. These pieces 19 reinforce the container and also serve to support portions of the cake when birds consume the same from the bottom up, for example.

A modified form of reinforcing means for the cake is shown in Fig. 4. This consists of sheets of cardboard or comparatively stiff waterproof material provided with tabs 20 preferably formed by striking out a portion of the sheet and folding substantially at right angles to the sheet. This sheet is to be fastened against the bottom of the box or container.

The above described reinforcing elements 20 help to prevent breakage of the suet cake and also hold it together if it does become broken by accident.

The suet cake container as above described is especially useful since it may be hung from a hook or nail and serve as a support for the cake. One manner of holding the cake is shown in Figs. 3 and 6. A hole is provided in the container at an edge between the end 10 and bottom 9. Before the container is filled, a fastening member 21 provided with a head 22, is passed through the hole and the end looped as shown in Fig. 3. In hanging the suet cake, the cover portion 15 is folded behind the cake and the fastening member 21 is passed through a hole 23 provided therein at the fold 13.

The portion 16 of the container is folded down to horizontal position and the sides 17 are sprung outwardly to prevent this ledge portion 16 from folding up. A feeding ledge is thus provided for the suspended suet cake.

The suet cake may also be used advantageously with a bird shelter as shown in Fig. 5. The bird shelter here illustrated is composed of a floor, four walls and a roof. Three of the four walls have large openings therein. The suet cake and its container may be placed within the shelter in a substantially vertical position with the flap 16 on the floor of the shelter. The ledge 16 serves under these circumstances as a means for preventing the cake from tipping forward. It also catches grain which is loosened from the cake as the birds are eating.

It will be understood that the use of my container is not intended to be limited to use with suet since it is equally well adapted for use with other bird feeds sold in cake form.

What I claim is:

1. A container for bird feeding cake comprising a back and relatively shallow sides, and cover members for said container each comprising an extension of a side of said container, one of said members having supporting side sections fastened to opposite sides of said container, said sections being arranged to fold against said container, the other cover member being adapted to be folded away to expose a vertical surface of the cake.

2. A container for a bird feeding cake comprising a back and relatively shallow sides, and two cover members for said container, one of said members being adapted to fold outwardly to form a shelf-like projection in front of said container, and having supporting side sections fastened to opposite sides of said container, the other cover member being adapted to be folded away to expose a vertical surface of the cake.

3. A container for bird feeding cake comprising a back and relatively shallow sides, and two cover members for said container, one of said members being adapted to fold outwardly to form a shelf-like projection in front of said container and having supporting side sections fastened to opposite sides of said container, the other cover member being adapted to be folded away to expose a vertical surface of the cake, and reinforcing means fastened to said container and extending into the space enclosed by said container.

4. A container for a bird feeding cake comprising a back and relatively shallow sides, and cover members for said container, one of said members being adapted to fold outwardly to form a shelf-like projection in front of said container and having supporting side sections fastened to opposite sides of said container, and reinforcing means comprising diagonal members in said container fastened to the side walls thereof.

5. A container for a bird feeding cake comprising a back and relatively shallow sides, and cover members for said container, one of said members being adapted to fold outwardly to form a shelf-like projection in front of said container and having supporting side sections fastened to opposite sides of said container, and reinforcing means comprising a back member having struck-out portions extending into the space enclosed by said container.

LLOYD G. COPEMAN.